United States Patent [19]

Franzak et al.

[11] Patent Number: 5,147,835

[45] Date of Patent: Sep. 15, 1992

[54] COMPOSITE TITANATE ALUMINATE DIELECTRIC MATERIAL

[75] Inventors: Agnes A. Franzak; Wei-Yean Howng, both of Albuquerque, N. Mex.

[73] Assignee: Motorola, Inc., Schaumburg, Ill.

[21] Appl. No.: 664,697

[22] Filed: Mar. 5, 1991

[51] Int. Cl.$^5$ .................. C04B 35/44; C04B 35/46
[52] U.S. Cl. .................. 501/134; 501/135; 501/136; 264/66
[58] Field of Search .............. 501/134, 135, 136; 264/66

[56] References Cited

U.S. PATENT DOCUMENTS

| | | | |
|---|---|---|---|
| 4,431,977 | 2/1984 | Sokola et al. | 333/206 |
| 4,614,725 | 9/1986 | Ando et al. | 501/136 |
| 4,942,146 | 7/1990 | Negas et al. | 501/136 |
| 4,980,246 | 12/1990 | Negas et al. | 501/136 |

FOREIGN PATENT DOCUMENTS

53-001899  1/1978  Japan .................. 501/136

OTHER PUBLICATIONS

D. Kajfez, et al. Dielectric Resonators, "Material Properties", Chapter 7 (1986) pp. 327–330 and 370–375.

*Primary Examiner*—Mark L. Bell
*Assistant Examiner*—Anthony J. Green
*Attorney, Agent, or Firm*—Douglas D. Fekete

[57] ABSTRACT

A sintered, composite ceramic material if formed of a plurality of titanate and aluminate compounds that cooperate to produce improved dielectric properties, including a dielectric constant between about 10 and 25, preferably between 14 and 21, and a temperature coefficient less than 15 ppm per °C., preferably less than 10 ppm per °C. The material exhibits an oxide composition generally characterized by the formula $$(MgO)_a(CaO)_b(TiO_2)_c(Al_2O_3)_d$$

wherein a,b,c, and d are mole fractions and a+b+c+d=1 and further wherein a is between about 0.36 and 0.47 mole fraction, b is between about 0.023 and 0.03, c is between about 0.386 and 0.50 and d is between about 0.05 and 0.23. The material is formed by a process that comprises first calcining a mixture formed of a suitable calcium oxide powder, a suitable magnesium oxide powder, and a suitable titanium oxide powder to form a titanate powder. The titanate powder is mixed with aluminum oxide powder, compacted and sintered to form a dense, integral body.

4 Claims, 2 Drawing Sheets

COMPOSITE TITANATE ALUMINATE DIELECTRIC MATERIAL

BACKGROUND OF THE INVENTION

This invention relates to a dielectric body formed of a sintered ceramic material composed of oxides of magnesium, calcium, titanium and aluminum. More particularly, this invention relates to such sintered composite dielectric material formed from a particular composition and made by a process that produces a dense body composed of a multiplicity of titanate and aluminate compounds that cooperate to provide an improved combination of dielectric properties including a dielectric constant within a particularly advantageous range and a low thermal coefficient.

In a radio or the like, a bandpass filter is employed to select a signal within a narrow frequency range, referred to as the resonant frequency, from a broad spectrum. Such filters are based upon a block of dielectric material, most commonly a ceramic material. The resonant frequency is determined by the dielectric properties of the material and by the dimensions of the block. Several ceramic materials are available for manufacturing bandpass filters, including several based upon titanate compounds. In general, a material is required having a low dielectric loss, as indicated by a high Q factor, to minimize energy absorption by the dielectric material that would otherwise reduce resonant signal intensity. In addition, common materials have a dielectric constant greater than 30. A high dielectric constant is desirable to reduce filter dimensions. However, for resonant frequencies above about 2 GHz, the small dimensions necessitated by the short wavelength becomes difficult to reliably obtain with high precision by conventional machining operations. Thus, there exists a need for a material having a dielectric constant less than 25 to produce a high frequency filter having dimensions that are more conducive for manufacture by conventional operations.

Furthermore, under typical operating conditions, a bandpass filter is inevitably subjected to variations in temperature. As temperature increases, filter dimensions are altered by thermal expansion of the material, which tends to shift the resonant frequency. Also, dielectric properties are affected, which also tends to shift the resonant frequency. The combination of these effects is indicated by the effective temperature coefficient at resonant frequency, $T_f$. A $T_f$ approaching 0 is preferred to minimize the shift in resonant frequency due to variations in the operating temperature.

SUMMARY OF THE INVENTION

This invention contemplates a dielectric material, in the form of a sintered ceramic body, having a high Q factor, a dielectric constant between about 10 and 25, preferably between about 14 and 21, and a temperature coefficient less than 15 ppm per °C., preferably less than 10 ppm per °C. As used herein, effective thermal coefficient refers to the deviation of the resonant frequency over a temperature range of $-35°$ C. to $+65°$ C. and is determined by measuring a resonant frequency between 1 and 6 GHz as a function of temperature over the specified range and dividing the absolute value of the difference between the maximum and minimum values by the temperature range. The dielectric material of this invention is particularly well suited for manufacturing electronic components such as a bandpass filter having a resonant frequency within the radio or microwave spectra, preferably greater than 2 GHz.

In accordance with a preferred embodiment of this invention, a dielectric body is formed of a sintered composite ceramic material that includes a plurality of distinct oxide compounds that cooperate to produce desired dielectric properties. The material is substantially composed of titanate compounds and aluminate compounds. The titanate compounds include significant phases of calcium titanate, $CaTiO_3$, and magnesium titanate, which may be either $MgTiO_3$ or $MgTi_2O_5$, and may include magnesium aluminum titanate $Mg_4Al_2Ti_9O_{25}$. The aluminate compound is predominantly magnesium aluminate $MgAl_2O_4$. The preferred material is the product of a selected oxide composition manufactured in accordance with a particular process. The overall composition is generally described by reference to constituent oxides in accordance with the empirical formula $(MgO)_a(CaO)_b(TiO_2)_c(Al_2O_3)_d$ wherein a, b, c and d are mole fractions totaling 1 and further wherein a is between about 0.36 and 0.47, b is between about 0.023 and 0.03, c is between about 0.386 and 0.50 and d is between about 0.05 and 0.23. In accordance with the process of this invention, a suitable calcium oxide powder, a suitable magnesium oxide powder and a suitable titanium oxide powder are first mixed and calcined to produce a composite titanate powder. The calcium oxide powder may be suitably formed of calcium oxide, CaO, or a compound, such as calcium carbonate, $CaCO_3$, that is thermally decomposable to form calcium oxide. Similarly, the magnesium oxide powder may be suitably formed of magnesium oxide, MgO, or a compound, such as magnesium carbonate $MgCO_3$, thermally decomposable to form magnesium oxide. A preferred titanate compound is titanium dioxide, $TiO_2$. A loose mixture of the constituent powders is calcined under conditions effective to interdiffuse the constituent oxides without sintering into a cohesive body, and so as to limit particle growth to produce a powder having an average particle size between about 1.5 and 2.0 microns. During calcining, the calcium oxide substantially reacts with the titaniums oxide to form calcium titanate $CaTiO_3$. Similarly, the magnesium oxide substantially reacts with titanium oxide to form magnesium titanate, substantially $MgTiO_3$. The presence of distinct calcium titanate phase is deemed surprising in view of the minor proportion of the constituent oxide. The powder preferably includes a minor portion of unreacted titanium dioxide, preferably between about 5 and 10 weight percent, to facilitate subsequent sintering. Calcining may be suitably carried out by heating the constituent oxide mixture for between about one and five hours at a temperature between about 900° C. and 1200° C., and preferably between about 950° C. and 1050° C.

In a second step, the titanate powder is then blended with alumina powder. The resulting mixture is compacted and sintered to form the product material. Sintering is carried out under conditions sufficient to interdiffuse the oxides and to react the alumina, mainly to form magnesium aluminate, as indicated by an absence of uncombined alumina in the product. Suitable sintering conditions include heating for a time between about one and five hours at a temperature of between about 1300° C. and 1425° C., preferably between about 1350° C. and 1425° C.

The resulting sintered body exhibits an advantageous combination of dielectric properties that include a high Q factor suitable for electronic component use, for example, for bandpass filters or the like. The material exhibits a dielectric constant within an advantageous range between about 10 and 25, preferably between about 10 and 21, to permit optimum sizing of a filter for manufacturing operations. Furthermore, the material has a thermal coefficient less than 15 ppm per °C. and preferably less than 10 ppm per °C. The dielectric body is manufactured from oxide constituents that are readily commercially available in high purity. Furthermore, the body is manufactured using conventional equipment and utilizing processing steps, such as ambient pressure sintering, of the type convenient for manufacture.

DESCRIPTION OF THE DRAWINGS

The present invention will be further illustrated with reference to the accompanying drawings wherein.

DETAILED DESCRIPTION OF THE INVENTION

Preferred embodiments of this invention are illustrated by the following examples:

EXAMPLE 1

A multiphase dielectric body was made in accordance with this invention having a constituent oxide composition represented by, in mole fractions, 0.44 MgO: 0.028 CaO: 0.475 $TiO_2$: 0.056 $Al_2O_3$.

A master magnesium calcium titanate powder was initially prepared from a mixture of 4.84 parts, by weight, powdered calcium carbonate, 30.6 parts by weight powdered magnesia and 64.6 parts by weight powdered titania. The mixture was ball milled using water for lubrication to produce a uniform fine particle suspension. The suspension was dried by heating in air at about 90° C. to form a cake and crushed to produce a fine powder. The fine powder was calcined by heating in air at a temperature of about 1000° C. for three hours. The resulting powder had an average particular size of about 1.7 microns as determined by x-ray sedigraph. The powder was analyzed by x-ray diffraction and found to contain predominantly phases corresponding to calcium titanate, $CaTiO_3$, and magnesium titanate $MgTiO_3$ but without significant content of intermetallic calcium magnesium compound. The powder further included unreacted titania in an amount estimated to be less than about 10 weight percent.

Figure 1:
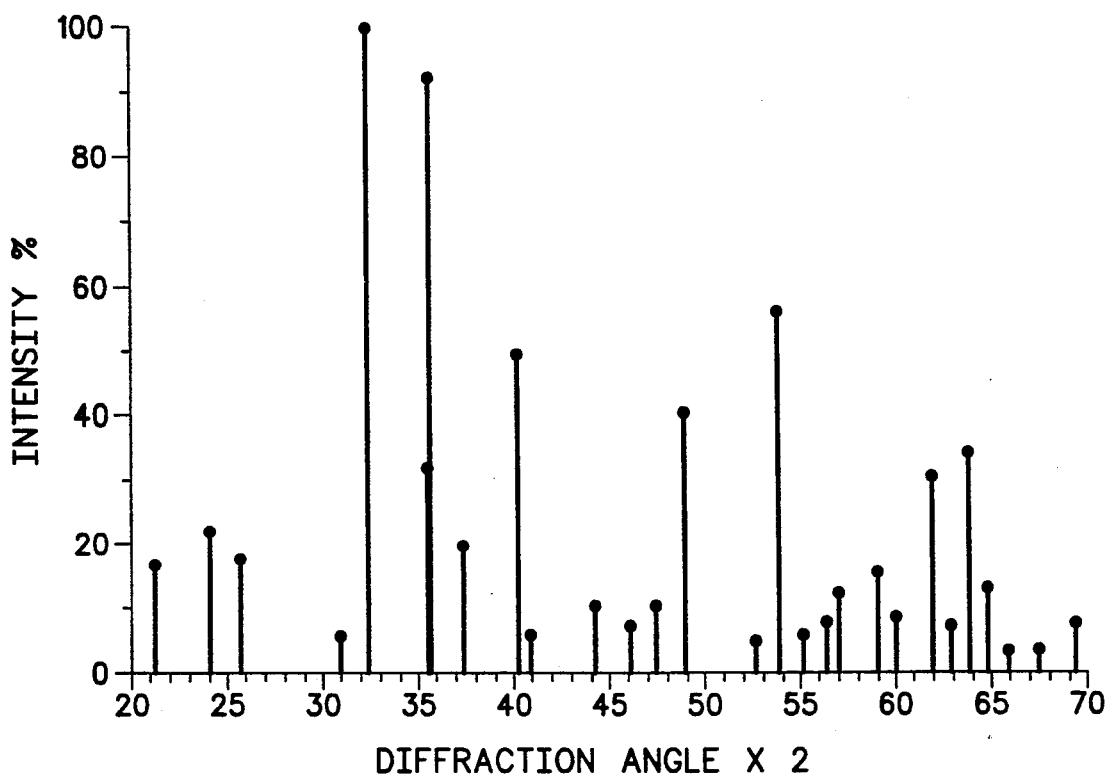
FIG. 1 is a computer enhanced x-ray diffraction pattern for a first example of a sintered composite dielectric material in accordance with this invention, wherein signal intensity is plotted as a function of 2 times the diffraction angle.

A powder mixture was prepared by blending about 91 parts by weight master titanate powder and about 9 parts by weight powdered alumina. The powder mixture was blended with an aqueous lubricant binder solution containing about 1.5 weight percent polyvinyl alcohol (PVA) and 1.5 weight percent glycerine, ball milled, and dried in a microwave oven to form a mass of free-flowing, fine granules. The dried powder was compacted at a pressure of about 17,000 PSI to produce a green body. The green body was sintered in air at a temperature of about 1350° C. for three hours to produce a an integral body that was about 95 percent theoretical density. The dielectric body was analyzed by x-ray diffraction in accordance with a standard JCPDS procedure. The resulting computer enhanced spectrum is depicted in FIG. 1, showing intensity in percent as a function of twice the diffraction angle. The spectrum curve was analyzed by computer to identify peak intensities. The sharp peaks were indicative of a multi-crystalline material, as opposed to a glassy or amorphous material. $MgTiO_3$ is indicated by significant peaks at about 24°, 62° and 64°. $CaTiO_3$ is indicated by significant peaks at about 47.5° and 59°. $Al_2O_3$ is associated with a strong peak at about 43°, the absence of which in the Figure is indicative of substantially complete reaction of the alumina during sintering. Complete reaction of the titanium dioxide is indicated by the absence of a peak at 27.5°. $MgAl_2O_4$ is indicated by significant peaks at about 36.5° and 65°. More complex $MgAl_2Ti_9O_{25}$ is indicated by peaks at 40.5° and 49°. $Mg\ Ti_2\ O_5$ is indicated by significant peaks at about 31°, 52.5°, and 55°.

Figure 2:
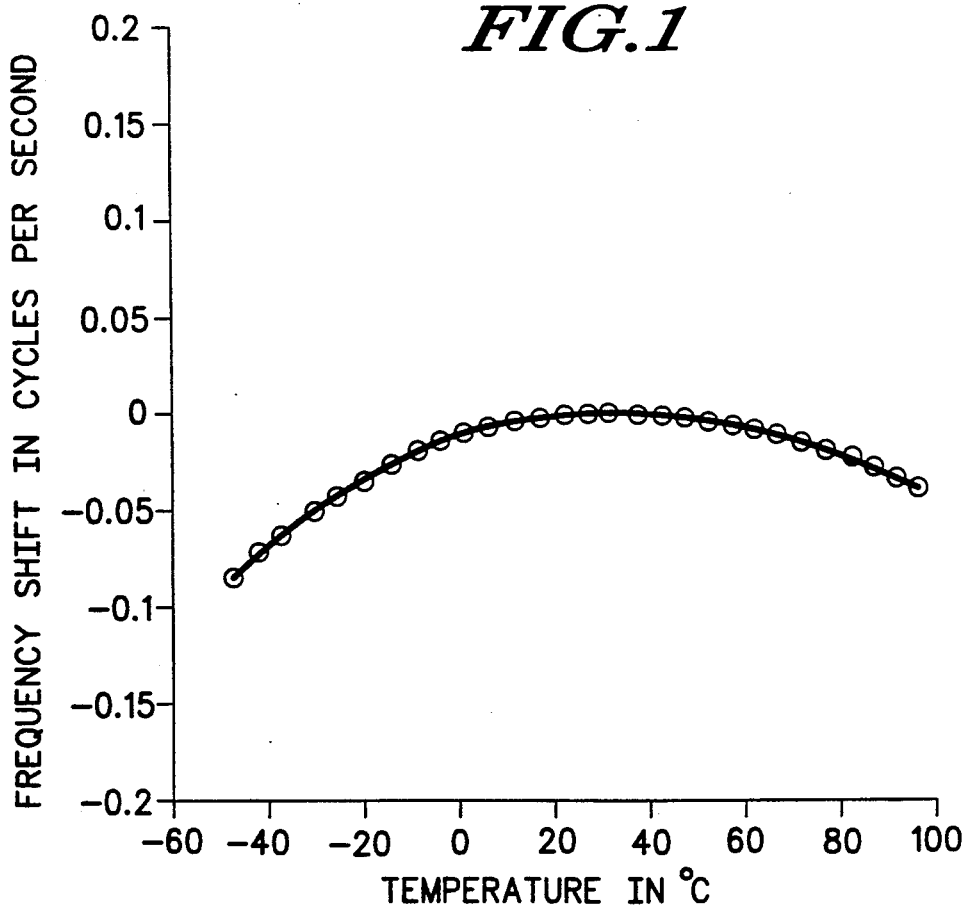
FIG. 2 is a graph showing shift in resonant frequency as a function of temperature over range of $-45°$ C. to $85°$ C. for body formed of the sintered composite dielectric material of FIG. 1.

The sintered body was analyzed to determine dielectric properties. Using a standard Hakki-Coleman procedure, the Q factor was determined to be 14000, and the dielectric constant was determined to be 20. The temperature coefficient was determined by applying an oscillating electromagnetic signal having a frequency between 1 and 6 GHz to the sintered body sufficient to produce resonance and measuring the value of the resonant frequency at several temperatures between $-45°$ C. and $+85°$ C. FIG. 2 shows a graph of the frequency shift normalized relative for the maximum frequency, as a function of temperature. The temperature coefficient was derived from the maximum absolute value of the frequency shift between $-35°$ and $-65°$ C. divided by the temperature range and was about 8 ppm per °C. The combination of these properties were considered to render the product composite oxide particularly well suited for use in a bandpass filter, particularly at relatively high radio and microwave frequencies.

EXAMPLE 2

A dielectric body was formed in accordance with this invention having an oxide composition represented by the formula 0.40 mole fraction MgO: 0.025 mole fraction CaO: 0.425 mole fraction $TiO_2$: 0.15 mole fraction $Al_2O_3$.

The body was produced using the master titanate powder formed in Example 1. A mixture of 77 parts by weight master titanate powder and 23 parts by weight powdered alumina was ball milled using PVA/glycerine solution, dried, compacted and sintered at a temperature of 1350° C. for three hours to produce a dense, integral body.

Figure 3:
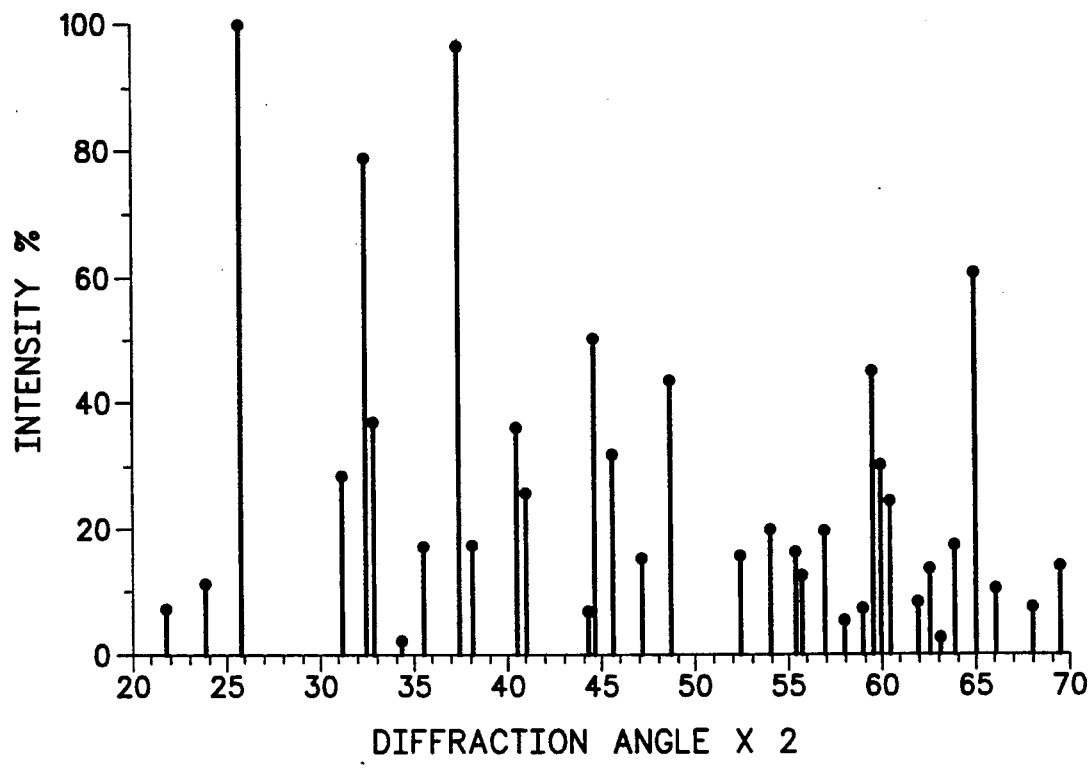
FIG. 3 is a computer enhanced x-ray diffraction pattern, similar to the pattern in FIG. 1, of another example of a sintered composite dielectric material in accordance with this invention.

FIG. 3 shows the computer enhanced x-ray diffraction pattern for the resulting material. The peaks indicate significant phases of $MgTiO_3$, $CaTiO_3$, $MgTi_2O_5$, $MgAl_2O_4$ and $MgAl_2Ti_9O_{25}$, as well as an absence of unreactive alumina and titanium dioxide. The dielectric constant for the material was 18. The resonant frequency shift as a function of temperature followed a curve similar to FIG. 2, and provided temperature coefficient of 9 ppm per °C. The Q factor was about 9000. Thus the material was particularly well suited for use in dielectric components such as a bandpass filter.

EXAMPLE 3

A dielectric body was formed of a sintered material having an oxide composition represented by the formula 0.362 mole fraction MgO: 0.023 mole fraction CaO: 0.386 mole fraction $TiO_2$: 0.229 mole fraction $Al_2O_3$.

The body was formed from a mixture of 66.7 weight percent master titanate alloy prepared in Example 1 and 33.3 parts by weight powdered alumina. The mixture was ball milled, dried, compacted and sintered at 1400° C. for three hours, pursuant to the procedure described in Example 1.

Figure 4:
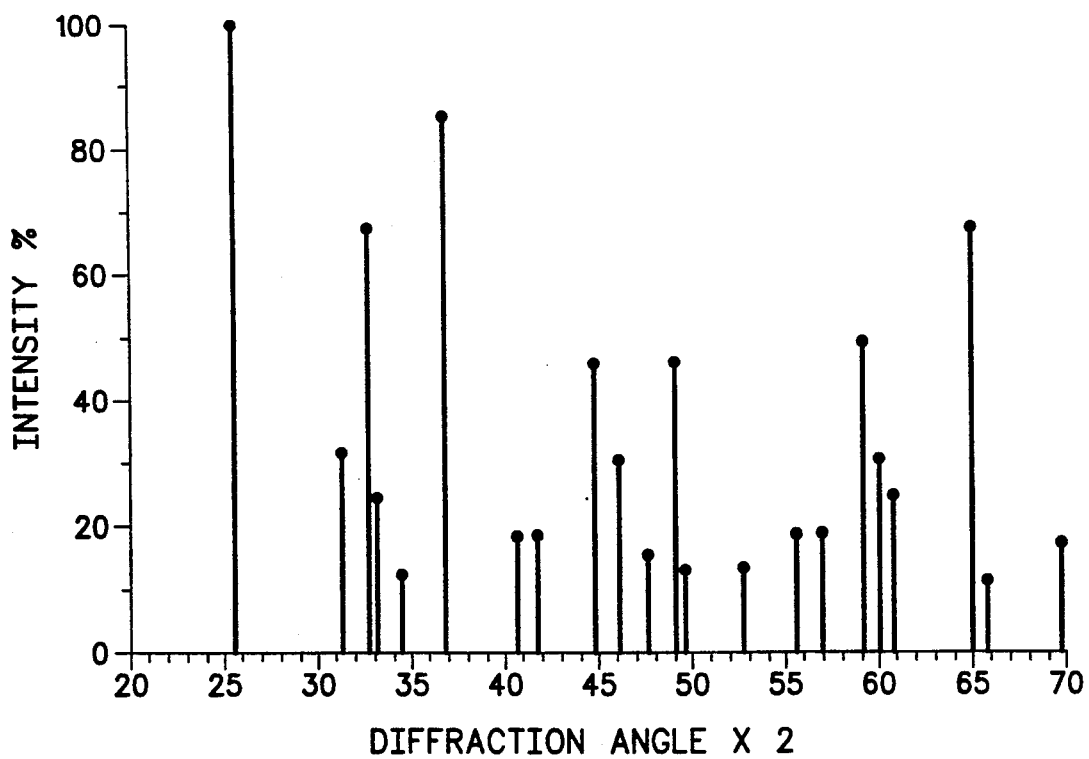
FIG. 4 is a computer enhanced x-ray diffraction pattern, similar to the pattern in FIG. 1, of still another example of a sintered composite dielectric material in accordance with this invention.

FIG. 4 shows the computer enhanced x-ray fraction spectrum for the resulting sintered body. Peaks in the spectrum indicates significant phases of $MgTiO_3$, $CaTiO_3$, $MgTi_2O_5$, $MgAl_2O_4$ and $MgAl_2Ti_9O_{25}$. The material exhibited a dielectric constant of 17, a resonant frequency shift as a function of temperature following to an arcuate curve similar to FIG. 2, and a temperature coefficient of 6 ppm per °C. The Q factor was about 4000.

EXAMPLE 4

A dielectric body in accordance with this invention was prepared having a oxide composition represented by, in mole fraction, 0.44 MgO: 0.028 CaO: 0.475 $TiO_2$: 0.056 $Al_2O_3$.

A mixture of, by weight, 30.55 parts powdered magnesium oxide, 4.84 parts powdered calcium carbonate and 64.6 parts powdered titanium dioxide was ball milled using water lubricant, dried, crushed to a fine powder and calcined at 1000° C. for three hours to produce a titanate powder. A mixture of 90.9 parts by weight of the titanate powder and 9.1 parts powdered alumina was milled and compacted with the assistance of a fugitive binder composed of DVA and glycerine and sintered at 1350° C. for three hours. The product integral body exhibited Q of about 14,000, a dielectric constant of 20.3 and a temperature coefficient of 8.1 ppm per °C., calculated pursuant to a resonant frequency shift curve similar to FIG. 2.

EXAMPLE 5

A sintered dielectric body in accordance with this invention was formed of an oxide composition corresponding to, in mole fraction, 0.42 MgO: 0.027 CaO: 0.448 $TiO_2$: 0.106 $Al_2O_3$.

About 30.55 parts by weight powdered magnesia, 4.84 parts by weight powdered calcium carbonate and 64.6 parts by weight powdered titanium dioxide were ball milled using water lubricant, dried, crushed and calcined at 1000° C. for three hours. About 83.3 parts by weight of the resulting titanate powder was mixed with 16.7 parts by weight powdered alumina, ball milled and compacted using PVA/glycerine fugitive binder and sintered at 1400° C. for three hours. The resulting multiphase oxide material exhibited a dielectric constant of 19.1 and Q of 9900. The temperature coefficient of the dielectric body was 3.9 ppm per °C., calculated from a resonant frequency shift curve similar to FIG. 2.

EXAMPLE 6

In this example, a dielectric body in accordance with this invention was prepared having an oxide composition in mole fraction of 0.40 MgO: 0.025 CaO: 0.425 $TiO_2$: 0.15 $Al_2O_3$.

A mixture of, by weight, 30.55 parts powdered magnesia, 4.84 parts powdered calcium carbonate and 64.6 parts powdered titanium dioxide was ball milled using water, dried, crushed to a fine powder and calcined at 1000° C. for three hours to produce a titanate powder. A mixture of 90.9 parts of the titanate powder and 9.1 parts powdered alumina, together with a fugitive PVA/glycerine binder, was compacted and sintered at 1375° C. for three hours. The resulting diffusion bonded, composite titanate and aluminate body exhibited a dielectric constant of 18.4, a resonant frequency shift pattern similar to FIG. 2, and a temperature coefficient of 7.8 ppm per °C.

EXAMPLE 7

In this example, a dielectric body in accordance with this invention was prepared having an oxide composition in mole fraction of 0.380 MgO: 0.024 CaO: 0.405 $TiO_2$: 0.191 $Al_2O_3$.

A mixture of, by weight, 30.55 parts powdered magnesia, 4.84 parts powdered calcium carbonate and 64.6 parts powdered titanium dioxide was ball milled using water, dried, crushed to a fine powder and calcined at 1000° C. for three hours to produce a titanate powder. A mixture of 71.4 parts of the titanate powder and 28.6 parts powdered alumina was compacted with a PVA/glycerine fugitive binder and sintered at 1425° C. for three hours. The resulting diffusion bonded, composite titanate and aluminate body exhibited a dielectric constant of 17.5, a temperature coefficient of 4.3 ppm per °C. and a resonant frequency shift pattern similar to FIG. 2.

EXAMPLE 8

In this example, a dielectric body in accordance with this invention was prepared having an oxide composition in mole fraction of 0.362 MgO: 0.023 CaO: 0.386 $TiO_2$: 0.229 $Al_2O_3$.

A mixture of, by weight, 30.55 parts powdered magnesia, 4.84 parts powdered calcium carbonate and 64.6 parts powdered titanium dioxide was ball milled using water, dried, crushed to a fine powder and calcined at 1000° C. for three hours to produce a titanate powder. A mixture of 66.7 parts of the titanate powder and 33.3 parts powdered alumina was compacted with a PVA/glycerine fugitive binder and sintered at 1425° C. for three hours. The resulting diffusion bonded, composite titanate and aluminate body exhibited a dielectric constant of 17.0, a resonant frequency shift pattern similar to FIG. 2, and a temperature coefficient of 6.4 ppm per °C.

As shown in these examples, this invention provides a dielectric body that is a complex composite of titanate compounds and aluminate compounds in proportions that produce a particularly advantageous combination of dielectric properties. While not limited to a particular theory, the material was formulated and processed with a view towards obtaining a balance between the dielectric properties of the calcium titanate compounds and the magnesium titanate compounds and to further obtain a balance between these titanate properties and the dielectric properties of the binder aluminate, so that the resulting composite exhibited a dielectric constant between 10 and 25 and a thermal coefficient less than 15 ppm per °C. The various magnesium titanate compounds were considered to have dielectric properties similar to MgTiO₃, which has a dielectric constant about 17 and a temperature coefficient of minus 45 ppm per °C. Calcium titanate compounds were considered to have properties similar to CaTiO₃, which has a dielectric constant of about 170 and a temperature coefficient of about plus 800 ppm per °C. The aluminate phases were indicated by Al₂O₃, which has a dielectric constant of 9.8 and a thermal coefficient of minus 55 ppm per °C., although no unreacted alumina was believed present in the sintered product. Thus, it is believed that a disproportionate addition of calcium oxide would produce excessive calcium titanate phases that would tend to increase the dielectric constant and the temperature coefficient beyond the desired ranges. A disproportionate addition of magnesium would produce excessive magnesium titanate that would produce a negative temperature coefficient outside the desired range. Excessive aluminate additions is also deemed to lower the temperature coefficient outside the desired range, as well as reducing the dielectric constant. Thus, the oxide formulation in accordance with this invention is believed to produce multiple intermetallic oxide phases in proportions sufficient to produce a desired average dielectric constant and average temperature coefficient.

In accordance with the process of this invention, a titanate powder is first formed by clacining a mixture of magnesium oxide calcium oxide and titanium dioxide. The titanate powder may be suitably formed either from the basic oxides or from a source that is thermally decomposable at calcining temperature to provide the desired oxidized metallic constituent. Thus, the calcium oxide constituent may be provided by a powder composed of CaO, or by a powder composed of calcium carbonate as in the Examples or other suitable compound that decomposes during calcining to provide calcium oxide. Similarly, magnesium oxide may be provided either as MgO or as magnesium carbonate or other suitable thermally decomposable magnesium compound. Similarly, titanium oxide may be provided by a thermally decomposable titanium compound, but titanium dioxide is readily available and preferred. The several constituent powders are calcined under conditions sufficient to substantially react the calcium oxide to form calcium titanate and to substantially react the magnesium oxide to form magnesium titanate. During calcining, there is a tendency for particle size to increase due to interdiffusion of the constituents. Excessive particle size of the titanate powder undesirably reduces density of the sintered product. Furthermore, the calcined powder preferably includes a minor content of unreacted titanium dioxide to facilitate subsequent sintering. However, excessive unreacted titanium dioxide greater than about 10 weight percent produces excessive shrinkage during sintering and is not desired. In general, calcining may be suitably carried out at temperatures between about 900° C. and 1200° C., with temperatures within the range of about 950° C. and 1050° C. being preferred. For calcining, the powder is heated for a time sufficient to substantially react the calcium oxide and the magnesium oxide without producing excessive particle size. In general, heating from between one and five hours is effective to produce a suitable titanate powder having an average particle size limited to between about 1.5 microns and 2.0 microns.

Following calcining, the titanate powder is blended with alumina powder and sintered to produce the desired dielectric body. In general, sintering temperatures greater than about 1300° C. are adequate to diffusion bond the particles into a dense product and to form the desired aluminate compounds, thereby producing a product that is substantially free of unreacted alumina. Temperatures greater than about 1425° C. tend to produce glassy phases that increase the temperature coefficient, in contrast to the desired intermetallic oxide compounds. Sintering temperatures within the range of between about 1350° C. and 1425° C. are preferred to minimize sintering time while avoiding glassy phase formation. Within the preferred range, sintering may be suitably accomplished within about one to five hours to assure an integrally bonded body having a density of about 95% of the theoretical value.

Dielectric ceramic material produced in accordance with this invention are particularly well suited for electromagnetic resonators and bandpass filters for radio and microwave frequency application, including filters of waveguide, co-axial stripline or microstrip design. However, the material is not limited to such use but may be useful in manufacturing other electronic components, including printed antenna, printed circuit interconnections or semiconductor chip carriers. The material possess a low dielectric constant within a specific, desirable range, a high Q and a low temperature coefficient that would make it particularly useful in manufacturing dielectric components for numerous applications.

The embodiments of the invention in which an exclusive property or privilege is claimed are defined as follows:

1. A process for forming a dense dielectric body composed of a composite oxide material characterized by the empirical formula $$(MgO)_a(CaO)_b(TiO_2)_c(Al_2O_3)_d$$

wherein a,b,c and d are mole fractions and a+b+c+d=1 and further wherein a is between about 0.36 and 0.47 mole fraction, b is between about 0.023 and 0.03, c is between about 0.386 and 0.50 and d is between about 0.05 and 0.23, said process comprising calcining a first mixture of a powdered calcium oxide precursor composed of a compound selected from the group consisting of calcium oxide and calcium compounds thermally decomposable to form calcium oxide, a powdered magnesium oxide precursor composed of a compound selected from the group consisting of magnesium oxide and magnesium compounds thermally decomposable to form magnesium oxide, and a powdered titanium oxide precursor composed of a compound selected from the group consisting of titanium oxide and titanium compounds thermally decomposable to form titanium oxide, said calcining being carried out for a time and at a temperature sufficient to produce a composite titanate powder composed predominantly of compounds of calcium titanate and magnesium titanate, blending the titanate powder and a powdered aluminum oxide precursor to obtain a second powder mixture, said aluminum oxide precursor being composed of a compound selected from the group consisting of aluminum oxide and aluminum compounds thermally decomposable to form aluminum oxide, and compacting and sintering the second powder mixture to produce an integrally bonded body, said sintering being carried out at a temperature and for a time sufficient to substantially react the alumina to form aluminate compounds within the body.

2. A process for forming a dense dielectric body having a dielectric constant between about 10 and 25 and a thermal coefficient at resonant frequency less than 15 ppm per °C., said body being formed from a composite of calcium oxide, magnesium oxide, titanium dioxide and aluminum oxide in accordance with the empirical formula $$(MgO)_a(CaO)_b(TiO_2)_c(Al_2O_3)_d$$

wherein a,b,c and d are mole fractions and $a+b+c+d=1$ and further wherein a is between about 0.36 and 0.47 mole fraction, b is between about 0.023 and 0.03, c is between about 0.386 and 0.50 and d is between about 0.05 and 0.23, said process comprising heating a first powder mixture of a calcium oxide precursor composed of a compound selected from the group consisting of calcium oxide and calcium carbonate, a magnesium oxide precursor composed of a compound selected from the group consisting of magnesium oxide and magnesium carbonate, and a titanium oxide powder for a time and at a temperature sufficient to produce a composite titanate powder composed predominantly of compounds of calcium titanate and magnesium titanate and containing not more than about 10 weight percent unreacted titanium oxide, blending the titanate powder and an aluminum oxide powder to obtain a second powder mixture, and compacting and sintering the second powder mixture to produce an integrally bonded body, said sintering being carried out at a temperature and for a time sufficient to substantially react the aluminum oxide to form aluminate compounds within the body and thereby to form a composite material composed predominantly of compounds of calcium titanate, magnesium titanate, magnesium aluminum titanate and magnesium aluminate.

3. A process for forming a dense dielectric body having a dielectric constant between about 14 and 21 and a thermal coefficient at resonant frequency less than 10 ppm per °C., said body being formed from a multiphase composition having the empirical formula $$(MgO)_a(CaO)_b(TiO_2)_c(Al_2O_3)_d$$

wherein a,b,c and d are mole fractions and $a+b+c+d=1$ and further wherein a is between about 0.36 and 0.47 mole fraction, b is between about 0.023 and 0.03, c is between about 0.386 and 0.50 and d is between about 0.05 and 0.23, said process comprising heating a first powder mixture of a calcium oxide precursor composed of a compound selected from the group consisting of calcium oxide and calcium carbonate, a magnesium oxide precursor composed of a compound selected from the group consisting of magnesium oxide and magnesium carbonate, and a titanium oxide powder for a time between about 1 and 5 hours and at a temperature between about 900° C. and 1200° C. to produce a composite titanate powder composed predominantly of compounds of calcium titanate and magnesium titanate and containing between about 5 and 10 weight percent unreacted titanium oxide, said powder having an average particle size between about 1.5 and 2.0 microns, milling a second powder mixture composed essentially of the titanate powder and an aluminum oxide powder, and compacting and sintering the milled second powder mixture to produce an integrally bonded body, said sintering being carried out at a temperature between about 1300° C. and 1425° C. and for a time between about 1 and 5 hours to form a composite material composed predominantly of compounds of calcium titanate, magnesium titanate, magnesium aluminum titanate and magnesium aluminate.

4. A process for forming a dense dielectric body having a dielectric constant between about 14 and 21 and a thermal coefficient at resonant frequency less than 10 ppm per °C., said body being formed from a multiphase composition having the empirical formula $$(MgO)_a(CaO)_b(TiO_2)_c(Al_2O_3)_d$$

wherein a,b,c and d are mole fractions and $a+b+c+d=1$ and further wherein a is between about 0.36 and 0.47 mole fraction, b is between about 0.023 and 0.03, c is between about 0.386 and 0.50 and d is between about 0.05 and 0.23, said process comprising heating a first powder mixture of a calcium oxide precursor composed of a compound selected from the group consisting of calcium oxide and calcium carbonate, a magnesium oxide precursor composed of a compound selected from the group consisting of magnesium oxide and magnesium carbonate, and a titanium oxide powder for a time between about 1 and 5 hours and at a temperature between about 950° C. and 1050° C. to produce a composite titanate powder composed predominantly of compounds of calcium titanate and magnesium titanate and containing between about 5 and 10 weight percent unreacted titanium oxide, said powder having an average particle size between about 1.5 and 2.0 microns, milling a second powder mixture composed essentially of the titanate powder and an aluminum oxide powder, and compacting and sintering the milled second powder mixture to produce an integrally bonded body, said sintering being carried out at a temperature between about 1350° C. and 1425° C. and for a time between about 1 and 5 hours to form a composite oxide material.

* * * * *